Figure 1:
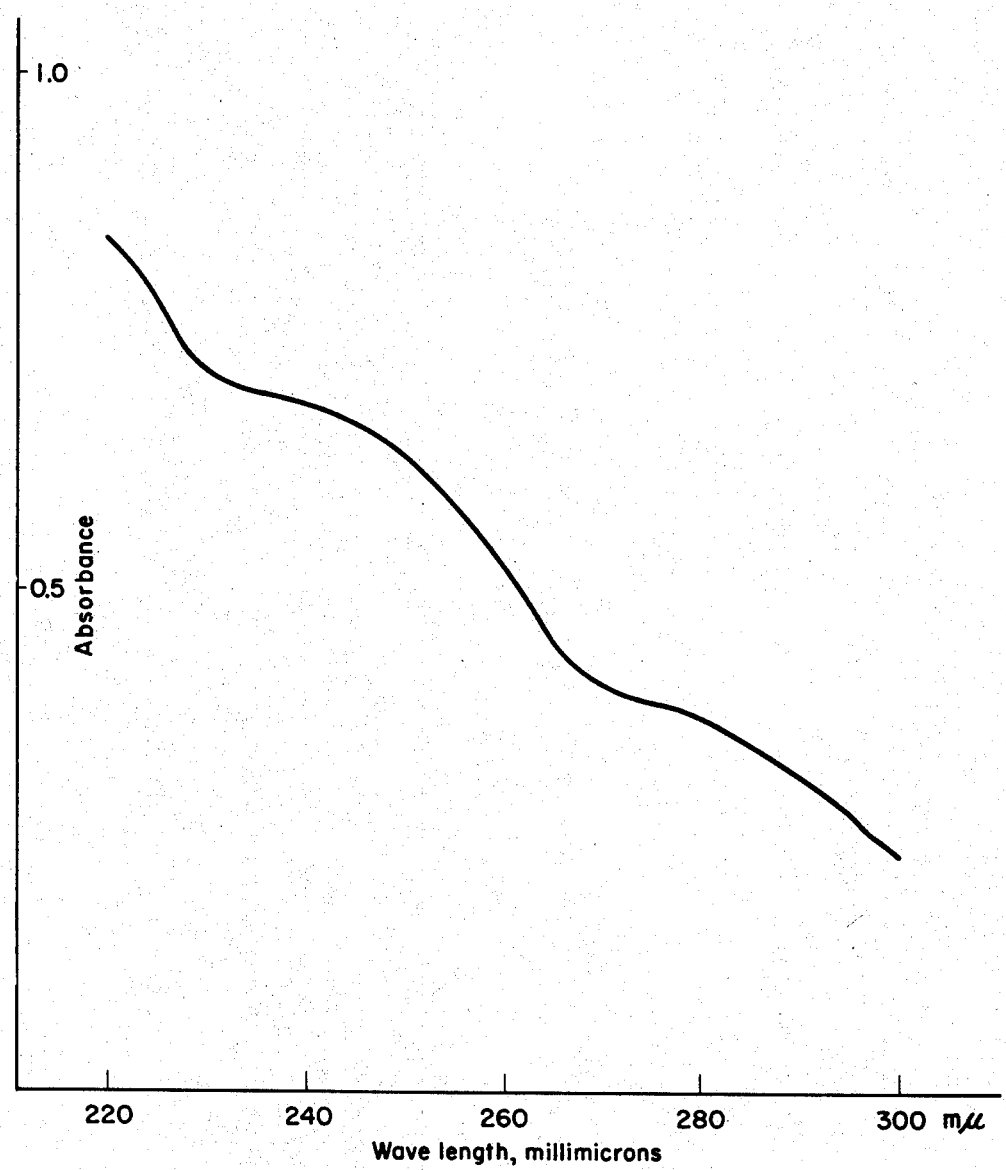

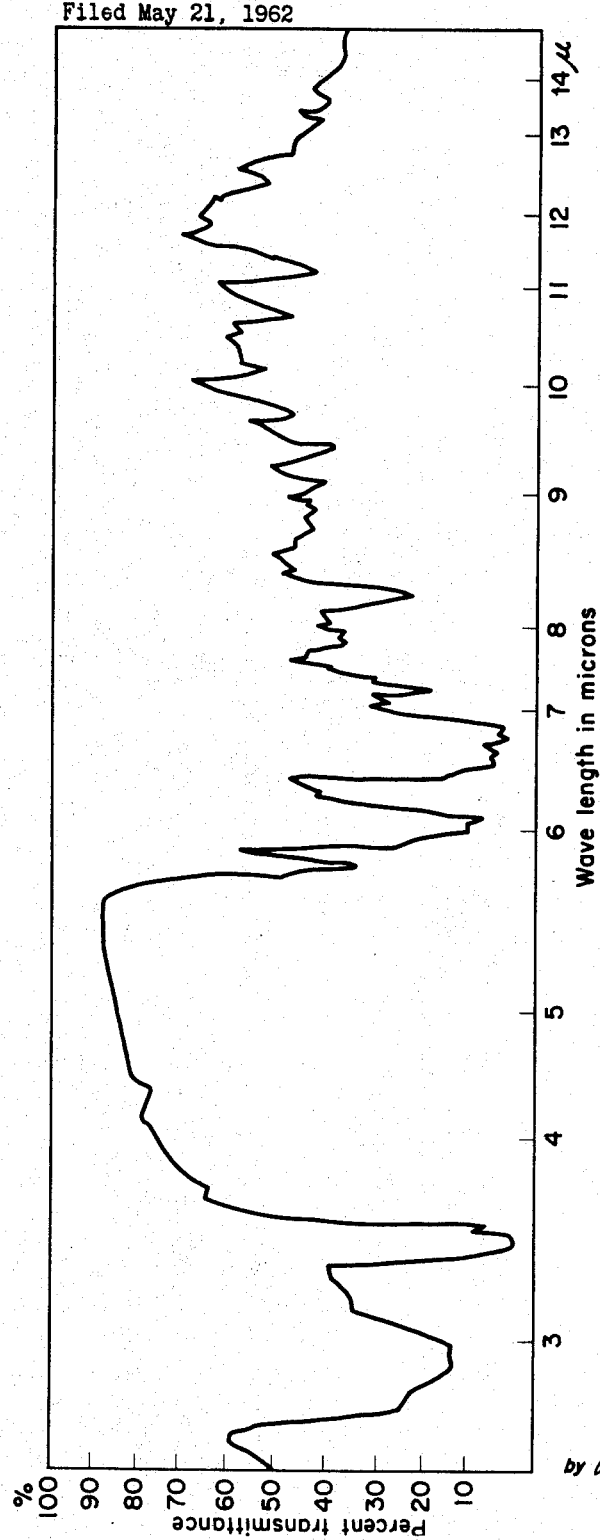

United States Patent Office 3,082,153
Patented Mar. 19, 1963

3,082,153
ANTIBIOTIC SIOMYCIN AND A METHOD OF PRODUCING SAME
Haruo Nishimura, Ashiya-shi, Japan, assignor to Shionogi & Co., Ltd., Osaka-shi, Japan
Filed May 21, 1962, Ser. No. 196,518
Claims priority, application Japan Nov. 10, 1960
8 Claims. (Cl. 167—65)

The present application is a continuation-in-part of co-pending application Serial No. 151,570, filed November 10, 1961, now abandoned.

This invention relates to a useful antibiotic designated "siomycin" and, more particularly, to its production by fermentation, to methods for its recovery and concentration from crude solutions, such as fermentation broths, and to processes for its purification. The invention includes within its scope the antibiotic in dilute forms, as crude concentrates, and in pure crystalline forms. These novel products are especially useful in combatting pathogenic microorganisms.

The new antibiotic is similar to thiostrepton, isolated by Vandeputte et al., with differences in specific rotation, amino acid composition and paper chromatographic behavior.

The new antibiotic is formed during the cultivation under controlled conditions of a new species of microorganism which has deposited with the American Type Culture Collection under an accession number ATCC 13989 and named *Streptomyces sioyaensis* n. sp.

This organism was isolated from a sample of soil collected from Shioya, Kobe, Japan, and shows the following microbiological characteristics.

Morphological Characteristics

The morphological properties of the strain were observed on glucose-asparagin agar and detailed observations were made by the agar-cylinder method (see Nishimura et al., J. Antibiotics, Ser. A, 10 (5): p. 227 (1957)). The microscopic observation of the aerial mycelium shows the latter to be characterized by forming main stem with irregular side branch. Most of the sporophores are straight to flexuous and open loops are observed partially.

Physiological Characteristics (1) COLOR CHARACTERISTICS

| Medium | Aerial mycelium | Substratum mycelium | Soluble pigment |
|---|---|---|---|
| Synthetic agar (Czapek's agar). | White | Pale orange | Pale orange. |
| Glucose-asparagine agar. | ......do........ | Reddish yellow. | Pale yellow. |
| Calcium malate agar. | ......do........ | Yellowish orange to dark orange. | Pale yellow orange. |
| Nutrient agar........ | Yellowish white. | Pale yellow to pale yellowish brown. | None. |
| Glucose-bouillon..... | White | Dull yellow orange. | Do. |
| Glucose-peptone agar. | ......do........ | Dark yellow..... | Pale yellow to pale yellowish brown. |
| Potato glucose agar. | ......do........ | ......do....●..... | None. |
| Soluble starch agar. | ......do........ | Pale yellow..... | Do. |
| Glycerol-asparagine agar. | White to yellowish white. | Reddish yellow to yellow orange. | Do. |

(2) BIOCHEMICAL CHARACTERISTICS

| Property | Result |
|---|---|
| Acid formation from glucose (10 days incubation, 28° C). | Negative. |
| Nitrate reduction................. | Positive, relatively strong. |
| Tyrosinase reaction................ | Negative. |
| Gelatin liquefaction................ | Do. |
| Cellulase reaction................. | Do. |
| Starch hydrolysis................. | Positive in soluble starch and potato starch, negative in corn starch. |

The utilizations of carbon and nitrogen sources by the organism are shown in the following table wherein the marks "+" and "++" indicate increasing utilization and, in the case of the mark "—," the source is not utilized.

Carbon sources: Result
Glycerol------------------------------------ ++
Glucose------------------------------------ ++
d-Galactose------------------------------- ++
Sucrose------------------------------------ ++
Maltose------------------------------------ ++
Lactose------------------------------------ ++

Cultural Characteristics

| Medium | Growth and sporulation | Characteristics of colony | | |
|---|---|---|---|---|
| | | Surface | Edge | Height |
| Synthetic agar (Czapek's agar)... | Excellent [1].. | Powdery, concentric rings... | Entire................ | Pulvinate to convex. |
| Glucose asparagine agar.......... | ......do....... | ......do.............. | Fimbricate........... | Convex. |
| Calcium malate agar............. | ......do [2]..... | Thick powdery......... | Entire............... | |
| Nutrient agar................... | Moderate..... | (Small colony)......... | | |
| Glucose-bouillon agar............ | Excellent [1].. | Powdery, concentric rings... | Lacerate to auriculate.. | Capitate to pulvinate. |
| Glucose-peptone agar............ | ......do....... | ......do.............. | Entire............... | Umbonate in central. |
| Potato glucose agar.............. | ......do [1]..... | Powdery to velvety..... | ......do............. | Convex to pulvinate. |
| Soluble starch agar.............. | Good........ | Powdery, concentric rings... | ......do............. | Convex. |
| Corn starch agar................ | None........ | | | |
| Glycerol-asparagine agar......... | Excellent..... | Powdery, rings......... | Fimbricate to lacerate.. | Do. |

[1] Some clear drops appear on the surface of aerial mycelium, but it does not become moist and does not form hygroscopic areas.
[2] Clear zone is observed.

NOTE.—Growth type on glucose broth—Ring type, trace sediment, no soluble pigment. Growth response to temperature—Good growth at 28° C., poor growth at 37° C., no growth at 45° C.

Carbon sources: Result
- Raffinose — ++
- Dextrin — ++
- Inulin — ++
- Mannose — ++
- d-Mannitol — ++
- dl-Inositol — ++
- Soluble starch — ++
- Potato starch — ++
- d-Xylose — +
- l-Rhamnose — +
- l-Arabinose — —
- d-Fructose — —
- Corn starch — —
- Salicin — —

Nitrogen sources:
- dl-Alanine — ++
- l-Aspartic acid — ++
- l-Histidine — ++
- Glycine — ++
- l-Arginine — ++
- l-Proline — ++
- dl-Valine — ++
- l-Leucine — ++
- l-Phenylalanine — ++
- l-Glutamic acid — ++
- Sodium nitrate — ++
- Ammonium biphosphate — ++
- dl-Methionine — +
- Urea — +
- Sodium nitrite — —

Among the many species of Streptomyces described in Bergey's "Manual of Determinative Bacteriology," Waksman and Lechevalier's "Actinomycetes and their Antibiotics" and other literature, Streptomyces albus appears to be similar to the microorganism, Streptomyces sioyaensis n. sp. in whitish aerial mycelium. However, the strain may be differentiated from the species, Streptomyces albus. Distinguishing characteristics, noted in the following table, are based on actual comparison with two strains of Streptomyces albus, ATCC 3004 and ATCC 3351.

| Properties | Streptomyces sioyaensis | Streptomyces aureus |
|---|---|---|
| Nutrient agar | Reverse, pale yellow to pale yellowish brown. SP, none. | Reverse, buffy brown. SP, brown. |
| Sabouraud's agar | Reverse, dark yellow orange. SP, pale yellowish brown. | Reverse, ochreous tawny to mars brown. SP, brown. |
| Soybean infusion agar | Edge of colony: fimbricate to lacerate. AM, white. Reverse, dark yellow orange. SP, dull yellow. | Edge of colony: entire AM, white to pale Hayne's gray. Reverse pale olive buff. SP, none. |
| Henrici's agar | Edge of colony: fimbricate. AM, white. Reverse, pale yellow. | Edge of colony: entire AM, white with dull gray. Reverse, blackish brown. |
| Yeast beef agar | Good growth. Reverse, pale yellow. | Slight growth. Reverse, avellaneous. |

NOTE.—AM, aerial mycelium; SP, soluble pigment.

As a result of the above observations, the microorganism has been designated a new species and named Streptomyces sioyaensis n. sp.

It is to be understood that for the production of siomycin the present invention is not limited to the use of Streptomyces sioyaensis n. sp. It is especially desired and intended to include the use of siomycin-producing mutants or variants produced from the described organism by various means, such as X-rays, ultra-violet radiation and nitrogen mustards.

In accordance with one aspect of the present invention, the new antibiotic siomycin is produced during cultivation of the microorganism, Streptomyces sioyaensis n. sp., in an aqueous nutrient medium at a temperature of about 25 to about 32° C., preferably 27 to 29° C., under aerobic conditions. The composition of this nutrient medium may be varied over a very wide range. Essentially what is required is a carbon source, a nitrogen source and trace inorganic elements. Examples of suitable carbon sources are starch, glucose, glycerol, dextrin, maltose, fructose, sucrose, lactose and molasses. Suitable sources of nitrogen for the fermentation process include meat extracts, peptone, corn steep liquor, soybean meal, peanut meal, wheat gluten, cotton seed flour, NZ amine (enzymatic hydrolyzate of casein) and yeast extracts. Exam-

| Properties | Streptomyces sioyaensis n. sp. | Streptomyces albus (ATCC 3004) | Streptomyces albus (ATCC 3351) |
|---|---|---|---|
| Morphology of aerial mycelium | Main stems form | Do not form | Do not form. |
| Surface of colony | Clear drops and typical concentric rings appear | Do not appear | Do not appear. |
| Growth type on glucose broth | Ring type | Ring→pellicle type | Ring→pellicle type. |
| Gelatin liquefaction | Negative | Positive (strong) | Positive (strong). |
| Corn starch agar | No growth | Thin growth | Thin growth. |
| Glucose asparagine agar | SM, reddish yellow; SP, pale yellow | SM pale yellow; SP, none | SM, pale olive; SP, none. |
| Czapek's agar | AM, white; SM, pale orange | AM, grayish white; SM, grayish white | AM, yellowish gray; SM, pale yellow. |
| Calcium malate agar | AM white; SM, yellowish orange; SP, pale yellow orange | AM, yellowish white; SM, yellowish gray; SP, none | AM, yellowish gray; SM, pale yellow; SP, none. |
| Glucose-bouillon agar | AM, white; SM, dull yellow orange | AM, yellowish white; SM, pale yellowish brown | AM, yellowish gray; SM, pale yellowish brown. |
| Glucose-peptone agar | SM, dark yellow; SP, pale yellow to pale yellow brown | SM, pale yellow; SP, none | SM, pale yellow; SP, none. |

Note.—SM substratum mycelium, AM aerial mycelium, SP soluble pigment.

The microorganism, Streptomyces sioyaensis, may also be differentiated from the thiostrepton-producing strain, Streptomyces aureus, as shown in the following table.

| Properties | Streptomyces sioyaensis | Streptomyces aureus |
|---|---|---|
| Utilization of carbon sources. | Poor growth: xylose, rhamnose. No growth: arabinose, fructose, salicin. | Good growth: arabinose, rhamnose, xylose, fructose. Poor growth: salicin. |
| Utilization of sodium nitrite | No growth | Good growth. |
| Reduction of nitrate. | Positive (strong) | Negative. |
| Czapek-Dox agar | Edge of colony: fimbricate to lacerate. AM, brownish white. Reverse, pale yellowish brown. | Edge of colony: entire AM, white with smoke gray medici blue spots. Reverse, pale olive buff with dark glaucous gray spots. |

See footnote at end of table.

ples of suitable sources of inorganic elements are mineral salts, such as sodium chloride, potassium chloride, calcium carbonate and potassium phosphate.

Furthermore the existence of trace metal ions such as iron, cobalt and manganese may sometimes yield good reslts. The nutrient medium may or may not be adjusted to about pH 7 prior to inoculation of the microorganism. The pH tends to remain rather constant during the fermentation but, if variations are encountered, a buffering agent such as calcium carbonate may be added to the medium. Occasionally, the pH moves to the alkaline side during the fermentation and, in such case, an acidic substance such as acetic acid and ammonium sulfate may be added. Generally speaking, the pH may be kept between 5.9 and 8.2, preferably around 7. If excessive foaming is encountered during the fermentation, antifoaming agents such as vegetable oils, lard oil and polypropyleneglycol may be added to the fermentation medium prior to or in the course of the fermentation. The maximum yields of the antibiotic siomycin can be obtained within about 72 to about 120 hours of fermentation under optimum conditions of temperature and aeration.

After growth of the microorganism, the mycelium may be removed from the fermentation broth by using standard equipment, such as filter-presses and centrifuges, and then the antibiotic siomycin may be recovered from the filtrate by a solvent extraction procedure. As the antibiotic siomycin is retained by the mycelium in appreciable quantities, a solvent extraction procedure is preferably used to recover the antibiotic from the mycelium or the whole broth without the removal of the mycelium. Suitable extraction solvents include dioxane, chloroform, N,N-dimethylacetamide and glacial acetic acid. For the extraction of the antibiotic from larger volumes of broth, however, an adsorption procedure is superior to an ordinary solvent extraction procedure. For instance, the whole broth may be filtered after the addition of an adsorbent, such as Hyflo Super-Cel (diatomaceous earth), and the resulting cake of adsorbent and mycelium may be eluted with a suitable organic solvent, such as chloroform and dioxane, to extract the antibiotic. The extract may be concentrated and a suitable organic solvent such as petroleum ether and hexane added to precipitate the crude active component.

The thus-obtained crude active component is further purified by suitable operations, such as recrystallization, chromatography and the like. Examples of suitable recrystallization solvents are dioxane, chloroform, methanol, ethanol, butanol, etc. The preferred chromatographic adsorbents are alumina, silica gel, silicic acid and the like.

The antibiotic siomycin is a yellowish-white or white crystalline solid which darkens at about 200° C. and melts with decomposition at about 255 to 260° C. It is soluble in dioxane, chloroform, N,N-dimethylacetamide and glacial acetic acid, slightly soluble in methanol, ethanol, butanol and propylene-glycol and insoluble in ether, acetone, benzene, hexane and petroleum ether.

Elementary analysis for siomycin is as follows. Found: C 49.26%, H 5.40%, N 14.61%, S 8.35%; O 22.38% (by difference). The molecular weight of siomycin is 1650 to 1850 by the Barger-Akiya method (see Akiya et al., J. Pharm, Soc. Japan, 57, p. 967 (1937)), and 1500 to 1750 by the Niederl method (see Niederl et al., Science, 100, p. 228 (1944)). The above analyses correspond to the molecular formula $C_{64}H_{88}N_{16}S_4O_{22}$ for siomycin. The specific rotation of siomycin is $[\alpha]_D^{33}$ —90.9°±2° (c.=1.017% in dioxane). The ultraviolet absorption spectrum in methanol presents no maxima (shown in the accompanying drawings, FIG. 1). The infrared absorption spectrum in a Nujol mull shows the following frequencies: 3.05, 5.75, 6.02, 6.12, 6.31, 6.53, 6.60, 6.74, 7.07, 7.24, 7.31, 7.41, 7.58, 7.73, 7.83, 8.09, 8.29, 8.54, 8.67, 8.80, 8.96, 9.12, 9.44, 9.67, 9.77, 10.19, 10.35, 10.51, 10.71, 10.97, 11.27, 11.72, 12.36, 12.85, 12.93, 13.14, 13.51 and 13.64μ (shown in the accompanying drawings, FIG. 2).

It gives negative Molisch and positive biuret and Fehling tests. The acid hydrolysate gives a strong ninhydrin test.

Paper chromatographic analysis of siomycin hydrolyzed with 6 N hydrochloric acid for 24 hours at 100° C. reveals the presence of a number of ninhydrin positive components, and these components are identified as follows: valine, alanine, threonine (or cysteine); no other conventional amino acids are found. Thus, the amino acid components existing in the molecule of siomycin are the said four amino acids.

Papergram bioautograph of siomycin in a mixture of methanol-acetic acid-water (25:3:72) shows an Rf value of 0.12 to 0.14.

The physical and chemical properties observed for siomycin, when compared with those reported for other antibiotics, suggest the existence of very similar features in thiostrepton. However, an actual comparison of the properties of siomycin with those of thiostrepton confirmed no identical substances.

The following table shows the properties observed for siomycin, comparing with those of thiostrepton.

| Properties | Siomycin | Thiostrepton |
|---|---|---|
| Melting point (decom.). | Darkens at about 200°C. and melts with decomposition at about 255° to 260°C. | Darkens at about 200°C. and melts with decomposition at about 246° to 255°C. |
| Elementary analysis. | C, 49.26; H, 5.40; N, 14.61; S, 8.35. | C, 49.56; H, 5.61; N, 14.63; S, 8.38. |
| Specific rotation | $[\alpha]_D^{30}$ —90.9°(+2°) (C.=1.017% in dioxane). | $[\alpha]_D^{30}$ —60.2°(+4°) (C.=0.548% in dioxane). |
| Amino acids composition. | Valine, alanine, threonine, cystine or (cysteine). | Leucine, alanine, threonine, cystine. |
| Rf value for a mixture of methanol-acetic acid-water (25:3:72). | 0.12 to 0.14 (single spot). | 0.38 to 0.40 (single spot). |

Siomycin shows activity against a variety of microorganisms and the following table illustrates the antibiotic spectrum of siomycin, compared with that of thiostrepton:

| Test organisms | Minimum inhibitory concentration, mcg. per ml. | |
|---|---|---|
| | Siomycin | Thiostrepton |
| 1. *Staphylococcus aureus*, 209 P | 0.05 | 0.1 |
| 2. *Bacillus subtilis*, PCI-219 | 0.05 | 0.1 |
| 3. *Sartina lutea* | 0.05 | 0.05 |
| 4. *Bacillus anthracis* | 0.2 | 0.2 |
| 5. *Diplococcus pneumoniae*, type I | 0.005 | 0.01 |
| 6. *Diplococcus pneumoniae*, V-type I | 0.005 | 0.01 |
| 7. *Diplococcus pneumoniae*, type II | 0.005 | 0.01 |
| 8. *Diplococcus pneumoniae*, type III | 0.005 | 0.005 |
| 9. *Streptococcus hemolyticus*, D | 0.01 | 0.02 |
| 10. *Streptococcus hemolyticus*, HA | 0.01 | 0.02 |
| 11. *Corynebacterium diphtheriae*, Tront | 0.005 | 0.01 |
| 12. *Corynebacterium diphtheriae*, S | 0.005 | 0.01 |
| 13. *Mycobacterium tuberculosis* var. *hominis*, H37RV | 2.0 | 5.0 |
| 14. *Mycobacterium smegmatis* | 2.0 | 2.0 |
| 15. *Mycobacterium phlei* | 2.0 | 2.0 |
| 16. *Mycobacterium arium* | 20.0 | 20.0 |
| 17. *Mycobacterium 607* | 10.0 | >20.0 |
| 18. *Candida albicans* | >20.0 | >20.0 |
| 19. *Escherichia coli*, Umezawa | >20.0 | >20.0 |
| 20. *Salmonella typhosa* | >20.0 | >20.0 |
| 21. *Salmonella paratyphia* A | >20.0 | >20.0 |
| 22. *Shigella dysenteriae* | >20.0 | >20.0 |
| 23. *Shigella paradysenteriae*, Ohara | >20.0 | >20.0 |

Culture medium: 1 to 4 and 19 to 23, beef extract; 5 to 12, beef extract plus 10% rabbit blood; 13, Kirchner plus 10% human plasma; 14 to 18, beef extract plus glycerol.

Method of testing: 1 to 12 and 14 to 23, agar-streak dilution method; 13, subsurface culture.

End point observed: 1 to 12 and 19 to 23, no growth after 24 hrs. at 37° C.; 13, no growth after 3 weeks at 37° C.; 14 to 17, no growth after 48 hrs. at 37° C.; 18 no growth after 72 hrs. at 27° C.

From the preceding table, it is seen that siomycin is highly active against gram-positive bacteria and mycobacteria, with little or no activity against gram-negative bacteria or Candida species. The antibacterial spectrum of siomycin is quite identical with that of thiostrepton. However, a quantitative difference is observed; as determined with the sensitive microorganisms, siomycin possesses approximately twice the activity of thiostrepton.

Because of its activity in vitro against gram-positive bacteria a chemotherapeutic test in mice with experimental *Diplococcus pneumoniae* infection was set up. Groups of 10 mice weighing 16–18 grams were infected by intraperitoneal injection of 100 MLD (minimum lethal dose) of *Diplococcus pneumoniae*, type I. The mice were treated 3, 24, 48, 72 and 96 hours after infection, and survival of infected mice was recorded up to 10 days after infection, at which time the tests were terminated.

An aqueous solution of siomycin was prepared by the following method: the antibiotic is dissolved in N,N-dimethylacetamide and diluted to the desired concentrations with sterile distilled water. The results of the tests are summarized in the following table.

| Route | Dosage, mg. per kg. per day | Number alive/Number tested | Percent effect | Median effective dose, $ED_{50}$, mg. per kg. |
|---|---|---|---|---|
| Subcutaneously | 0.5<br>1.0<br>2.0 | 8/10<br>8/10<br>10/10 | 80<br>80<br>100 | <0.5 |
| Intravenously | 0.5<br>1.0<br>2.0 | 8/10<br>10/10<br>10/10 | 80<br>100<br>100 | <0.5 |

Thus, siomycin is effective by the intravenous route at a dose of 1 mg. per kg. at which 100 percent protection is obtained for the infected animals. By subcutaneous administration, 100 percent protection is obtained with a dose of 2 mg. per kg. of body weight.

Acute toxicity studies on siomycin were carried out in mice weighing 15 to 16 g. following a ten day observation period. The intravenous acute $LD_{50}$ for mice was about 100 mg. per kg. of body weight.

The mice are here standard experimental animals and the obtained results are statistically significant.

The new antibiotic siomycin is useful as an agent for inhibiting the growth of gram-positive pathogenic microorganisms. It is useful for sterilizing equipment, for example surgical instruments. It is also useful in obtaining pure cultures of single organisms where a susceptible organism may be separated from a resistant one.

The following examples are given solely for the purpose of illustration and are not to be construed as limitations of this invention, many variations of which are possible.

*Example 1*

A nutrient medium (20 litres) is prepared from the following materials:

| | Grams per litre |
|---|---|
| Glycerol | 5 |
| Potato starch | 10 |
| Corn steep liquor | 5 |
| Soybean meal | 3 |
| Sodium chloride | 3 |
| Calcium carbonate | 3.5 |

Water is added to the desired volume (20 litres).

After adjusting the mixture to a pH of 7, steam is passed through the mixture to sterilize it. Then the nutrient medium is inoculated with *Streptomyces sioyaensis* n. sp. and cultivated under aeration for a period of 72 to 120 hours at 27° C., with shaking until the siomycin concentration is 40 micrograms per millilitre. The antibiotic concentration in the fermentation broth is determined by the paper-disc or cup method (see Edwin et al., J. Bacteriology, 50: p. 459 (1945); Nishimura et al., Annual Report of Shionogi Research Laboratory, 11, p. 145 (1961)), using *Staphylococcus aureus*, Terashima or *Bacillus subtilis*, PCI 219.

One percent by weight of Hyflo Super-Cel (diatomaceous earth) is added to the fermentation broth containing the mycelium and the mixture is adjusted to a pH of 5.0 with hydrochloric acid. After 30 minutes of stirring, the mixture is filtered with suction. The filtered Hyflo Super-Cel and mycelial cake is washed with water, and the washed cake is eluted thrice with chloroform with vigorous agitating, by using each time a volume of the solvent corresponding to about one-tenth of the volume of broth. The chloroform extracts are combined and concentrated in vacuo to a small volume. A crude preparation is obtained by precipitating the concentrated chloroform extract with five volumes of petroleum ether or hexane. The precipitate is washed with petroleum ether. On drying this precipitate in a vacuum desiccator, a yellowish brown powder of siomycin (1500 milligrams) is obtained. The dried powder of siomycin is then dissolved in a large amount of chloroform and filtered. The filtrate is concentrated in vacuo to a small volume. The condensate is then poured into a glass column containing chromatographic alumina through which methanol has been previously percolated. The column is then developed with chloroform. The active chloroform fractions are combined and concentrated in vacuo to a small volume. By the addition of methanol to the concentrated chloroform fraction, siomycin is precipitated as crystals. The crystalline precipitate (150 milligrams) is recrystallized by dissolving it in dioxane and then adding methanol to the resulting solution. By this method, white or slight yellowish white crystals of siomycin (120 milligrams) are obtained.

*Example 2*

A seed medium (150 millilitres) is prepared from the following materials:

| | Grams per litre |
|---|---|
| Glucose | 10 |
| NZ amine (enzymatic hydrolysate of casein manufactured by Sheffield Chemical Co.) | 2 |
| Yeast extract | 1 |
| Meat extract | 1 |

No pH adjusted.

After sterilizing for 15 minutes at 121° C., the medium is inoculated with *Streptomyces sioyaensis* n. sp., shaken for 47 hours at 29° C. and used as inoculum.

A nutrient medium (50 litres) is prepared from the following materials:

| | Per litre |
|---|---|
| Soybean meal | grams 40 |
| Potato starch | do 30 |
| Calcium carbonate | do 2.5 |
| Acetic acid | millilitre 0.2 |

After potato starch is pre-cooked by heating with acetic acid and water (20 litres) for 15 minutes at 70° C., there are added soybean meal and calcium carbonate. The whole is made to the desired volume (50 litres) with water. Sterilizing for 20 minutes at 120° C., the nutrient medium is distributed in a 100 litres-tank and Niax Diol PPG-2025 (polypropyleneglycol of average molecular weight 2000 and average hydroxyl number 56 manufactured by Union Carbide Chemicals Co.) (50 millilitres) is added as an antifoaming agent. Then, the nutrient medium is inoculated with the above-prepared inoculum (150 millilitres) and cultivated under aeration for a period of 95 to 98 hours at a temperature of 28 to 29° C. with agitation. During the cultivation, the pH is kept between 7.0 and 7.2, when variations are encountered, by the occasional addition of acetic acid and the aeration speed is controlled at a half volume of the medium per minute for the initial 16 hours and then at the one-fifth volume of the medium per minute for the remainder of the period. The antibiotic concentration in the fermentation broth reaches around 100 micrograms per millilitre.

*Example 3*

Nutrient mediums are prepared as follows:

Medium A (50 litres):

| | Per litre |
|---|---|
| Soybean meal | grams 40 |
| Potato starch | do 30 |
| Calcium carbonate | do 2.5 |
| Niax Diol PPG-2025 | millilitre 1 |
| Acetic acid | do 0.4 |

No pH adjusted.

After potato starch is pre-cooked by heating with acetic acid and water (30 litres) for 15 minutes at 70° C., there are added soybean meal, calcium carbonate and Niax Diol PPG–2025. The whole is made to the desired volume (50 litres) with water.

Medium B (550 litres):

| | Per litre |
|---|---|
| Soybean meal_____grams__ | 40 |
| Potato starch_____do____ | 30 |
| Calcium carbonate_____do____ | 2 |
| Niax Diol PPG–2025_____millilitre__ | 1 |
| Acetic acid_____do____ | 0.4 |

No pH adjusted.

After potato starch is pre-cooked by heating with acetic acid and water (200 litres) for 15 minutes at 70° C., there are added soybean meal, calcium carbonate and Niax Diol PPG–2025. The whole is made to the desired volume (550 litres) with water.

Medium A is distributed in a 100 litres seed tank and sterilized by passing through steam at 121° C. for 20 minutes. The seed medium is inoculated with the inoculum (150 millilitres) prepared as in Example 2 and cultivated under aeration (10 litres per minute) for 28 hours at 29° C. while agitating (380 rotations per minute).

Medium B is distributed in a 1000 litres fermenter tank and sterilized by passing through steam at 121° C. for 20 minutes. To the fermentation medium, there is added the above-prepared seed broth. The cultivation is performed under aeration (75 litres per minute) for 84.5 hours at 29° C. while agitating (240 rotations per minute). During the cultivation, the pH is kept at 7.0 to 7.2 by the occasional addition of acetic acid. The antibiotic concentration in the fermentation broth reaches 41 micrograms per millilitre.

The resultant fermentation broth (500 litres) is treated as in Example 1 to yield pure crystals of siomycin (4.6 grams).

Modifications may be made in carrying out the present invention without departing from the spirit and scope thereof, and I am to be limited only by the appended claims.

I claim:

1. A process for producing a new antibiotic, siomycin, which comprises cultivating a strain of *Streptomyces sioyaensis* in an aqueous nutrient medium under aerobic conditions, and recovering the accumulated antibiotic from the fermentation broth.

2. A process for producing a new antibiotic, siomycin, which comprises cultivating a strain of *Streptomyces sioyaensis* in an aqueous nutrient medium under submerged aerobic conditions at a temperature of from about 25 to about 32° C. for a period of from about 72 to about 120 hours.

3. A process for producing a new antibiotic, siomycin, which comprises cultivating a strain of *Streptomyces sioyaensis* in an aqueous nutrient medium under submerged aerobic conditions and recovering siomycin from the fermentation broth.

4. A process for producing a new antibiotic, siomycin, which comprises cultivating a strain of *Streptomyces sioyaensis* in an aqueous nutrient medium under submerbed aerobic conditions, filtering the ferementation broth and extracting the filtrate broth with a water-immiscible organic solvent.

5. A process for producing a new antibiotic, siomycin, which comprises cultivating a strain of *Streptomyces sioyaensis* in an aqueous nutrient medium under submerged aerobic conditions, and extracting the fermentation broth with a water-immiscible organic solvent.

6. A process for producing a new antibiotic, siomycin, which comprises cultivating a strain of *Streptomyces sioyaensis* in an aqueous nutrient medium under submerged aerobic conditions, adding an adsorbent to the fermentation broth, filtering the mixture and extracting the resulting cake of the adsorbent and the mycelium with a water-immiscible organic solvent.

7. A process for producing a new antibiotic, siomycin, which comprises cultivating a strain of *Streptomyces sioyaensis* in an aqueous nutrient medium under submerged aerobic conditions, treating the fermentation broth with an adsorbent at a pH of about 5.0, filtering the mixture, extracting the resulting cake of the adsorbent and the mycelium with a water-immiscible organic solvent, concentrating the extract to obtain a crude product, precipitating crude siomycin from the crude product with addition of an insoluble organic solvent, and chromatographing a solution of the crude siomycin in a soluble organic solvent with subsequent elution to isolate siomycin.

8. The new antibiotic, siomycin, effective in inhibiting the growth of gram-positive microorganisms, said antibiotic being a crystal darkening at about 200° C., and decomposing at about 255 to 260° C., containing the elements carbon, hydrogen, nitrogen, sulfur and oxygen in substantially the following proportions by weight:

| | Percent |
|---|---|
| Carbon | 49.26 |
| Hydrogen | 5.40 |
| Nitrogen | 14.61 |
| Sulfur | 8.35 |
| Oxygen (by difference) | 22.38 | having an optical rotation of $[\alpha]_D^{33} = -90.9° \pm 2°$ when dissolved in dioxane (c.=1.017%), having the molecular formula $C_{64}H_{88}N_{16}S_4O_{22}$ and a molecular weight of 1560, and showing the ultraviolet spectrum and the infrared spectrum as in the attached drawings, FIG. 1 and FIG. 2, respectively.

References Cited in the file of this patent

Vandeputte et al.: Antibiotics Annual, 1955–1956, p. 560.